(12) United States Patent
Bell et al.

(10) Patent No.: US 9,769,533 B2
(45) Date of Patent: *Sep. 19, 2017

(54) METHODS AND APPARATUS FOR PROVIDING VOICE MAIL SERVICES

(71) Applicant: Time Warner Cable Enterprises LLC, New York, NY (US)

(72) Inventors: David G Bell, Broomfield, CO (US); Matthew Cannon, Sterling, VA (US); Chad Enney, Broomfield, CO (US); Tom Gonder, Tega Cay, SC (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,159

(22) Filed: May 3, 2016

(65) Prior Publication Data

US 2016/0249103 A1    Aug. 25, 2016

Related U.S. Application Data

(63) Continuation of application No. 13/890,929, filed on May 9, 2013, now Pat. No. 9,369,769, which is a continuation of application No. 12/554,126, filed on Sep. 4, 2009, now Pat. No. 8,443,403.

(51) Int. Cl.
H04N 7/10    (2006.01)
H04N 7/025   (2006.01)
(Continued)

(52) U.S. Cl.
CPC .......... *H04N 21/478* (2013.01); *H04M 3/533* (2013.01); *H04M 3/5315* (2013.01);
(Continued)

(58) Field of Classification Search
CPC ......... H04L 63/10; H04L 65/40; H04L 65/60; H04M 1/72547; H04M 1/72552;
(Continued)

(56) References Cited

U.S. PATENT DOCUMENTS 7,054,654 B1 *  5/2006  Sladek ................ H04W 88/184
                                                    370/260
7,251,480 B1 *  7/2007  Oh ...................... H04W 88/181
                                                    379/67.1

(Continued)

*Primary Examiner* — Jason Salce
(74) *Attorney, Agent, or Firm* — Michael P. Straub; Stephen T. Straub; Ronald P. Straub (57) ABSTRACT

Methods and apparatus for retrieving and providing voice mail messages from a server are described. In accordance with the invention voice mail messages may be retrieved via requests made via a set top box. Voice mail messages are retrieved in response to the request from a voice mail server which is also accessible via the telephone network. Retrieved voice mail is transcoded and included in a video on demand (VOD) file. Text, call ID information and/or other information as, e.g., an automatically generated transcript of the voice mail message, may be included in the VOD file. The VOD file is supplied to a VOD server which provides the file including the message to the set top box for display. A user can view the messages and switch from viewing one message to the next by using video play back commands.

20 Claims, 4 Drawing Sheets

(51) Int. Cl.
  *H04N 21/478* (2011.01)
  *H04M 3/533* (2006.01)
  *H04M 7/12* (2006.01)
  *H04N 21/2343* (2011.01)
  *H04N 21/254* (2011.01)
  *H04N 21/81* (2011.01)
  *H04M 3/53* (2006.01)
  *H04M 1/247* (2006.01)

(52) U.S. Cl.
  CPC ..... *H04M 3/53333* (2013.01); *H04M 7/1215* (2013.01); *H04N 21/234336* (2013.01); *H04N 21/254* (2013.01); *H04N 21/8106* (2013.01); *H04M 1/2473* (2013.01); *H04M 2201/60* (2013.01)

(58) Field of Classification Search
  CPC ........... H04M 3/53333; H04M 1/7255; H04M 1/72555; H04N 21/41407; H04N 21/2747; H04N 21/478
  USPC .... 725/34–36, 40–41, 43, 60, 106; 455/413; 370/1.02
  See application file for complete search history.

(56) References Cited

U.S. PATENT DOCUMENTS

| | | | |
|---|---|---|---|
| 7,290,058 B2* | 10/2007 | Zhu | H04L 12/58 348/E7.069 |
| 2002/0019984 A1* | 2/2002 | Rakib | G08B 13/19656 725/111 |
| 2003/0108176 A1* | 6/2003 | Kung | H04M 3/54 379/211.02 |
| 2003/0132953 A1* | 7/2003 | Johnson | H04N 7/17318 715/716 |
| 2004/0121761 A1* | 6/2004 | Tripathy | H04M 1/7255 455/413 |
| 2006/0031904 A1* | 2/2006 | Groff | H04M 1/006 725/106 |
| 2007/0124795 A1* | 5/2007 | McKissick | G06Q 30/02 725/135 |
| 2007/0250845 A1* | 10/2007 | Walter | H04H 60/52 725/10 |
| 2008/0056459 A1* | 3/2008 | Vallier | H04L 12/58 379/88.12 |
| 2008/0120662 A1* | 5/2008 | Bartfeld | H04N 7/17318 725/109 |
| 2009/0022140 A1* | 1/2009 | Cassanova | H04L 12/5692 370/352 |
| 2009/0025028 A1* | 1/2009 | Cassanova | H04N 21/4786 725/34 |
| 2009/0207984 A1* | 8/2009 | Lafreniere | H04M 1/6505 379/88.23 |
| 2009/0328118 A1* | 12/2009 | Ravishankar | H04M 3/42042 725/106 |
| 2010/0167699 A1* | 7/2010 | Sigmund | H04M 3/02 455/413 |
| 2010/0296643 A1* | 11/2010 | Athias | H04L 12/581 379/220.01 |

* cited by examiner

METHODS AND APPARATUS FOR PROVIDING VOICE MAIL SERVICES

RELATED APPLICATIONS

The present application is a continuation of U.S. patent application Ser. No. 13/890,929 filed May 9, 2013 which is a continuation of U.S. patent application Ser. No. 12/554,126 filed Sep. 4, 2009, each of which is hereby expressly incorporated by reference in its entirety.

FIELD OF INVENTION

The present application relates to voice mail methods and more particularly, to methods and apparatus for providing access to voice mail via a system which supports video on demand playback capability.

BACKGROUND

Voice mail has become an important part of communication. As communication systems have become more integrated over time and service providers offer packages of telephone, data and video services, users of such services have a growing expectation that they will be able to access their voice mail in a variety of ways.

Providing voice mail via conventional telephone access and more recently via data connections and services which support IP has become more common. In the case of video systems however, e.g., cable systems, providing access to and control over voice mail has proven to be more difficult. This is, in part, due to the amount of legacy equipment deployed in cable systems. In such systems set top boxes are normally located in individual customer premises. The older set top boxes were generally designed to support video services and not necessarily interactive voice mail services or non-video data intensive services.

Like older set top boxes, many of the servers in cable headends were primarily designed to distribute video content. Such systems were, in many cases, not designed for the purpose of distributing voice mail messages or for supporting access to voice mail.

While cable network providers have often added voice mail servers to their systems to provide voice mail to users who subscribe to combined telephony, data and video packages, such voice mail servers have primarily been accessible to end users via telephone devices and not through set top boxes.

In order to increase the level of integration of services, it would be desirable if methods and apparatus could be developed which would allow a user access to the user's network based voice mail via a set top box. It would be particularly desirable if such methods could be developed without requiring major new elements in a cable network or replacement of existing set top boxes.

SUMMARY

Methods and apparatus for retrieving and providing voice mail messages from a voice mail server are described. Messages are retrieved for presentation in response to signals received from a set top box and are displayed on a device coupled to the set top box. Advantageously, methods and apparatus described herein can be implemented without requiring hardware upgrades to many currently deployed set top boxes and often without major hardware modifications to systems in a cable network headend.

In accordance with the invention voice mail messages may be retrieved from a server, e.g., a voice mail server, used to provide network based voice mail services via requests made via a set top box. The server from which the messages are received may be a server which allows for access to the voice mail messages via a telephone network as is commonly the case.

Retrieved voice mail content is transcoded, if necessary, to covert the audio portion of the voice mail message from a first audio format supported by the voice mail server to a second audio format supported by a STB, television, or other device to which a generated video on demand (VOD) file is to be supplied for playback. The transcoded audio is incorporated into a video on demand (VOD) file generated by the transcoder. The transcoder may be implemented as a separate physical device form the voice mail server or incorporated as a module into the voice mail server.

Multiple retrieved voice messages may be included in a single VOD file. Alternatively, a single VOD file may be generated for each retrieved voice mail message. Incorporation of multiple retrieved voice messages into a single VOD file facilities navigation and playback of voice mail messages using a remote control and standard VOD control functions such as fast forward, skip, rewind, etc. Text information, e.g., caller ID information and/or other information such as an automatically generated transcript of the voice mail message or messages may be included in the VOD file which is generated. The inclusion of text information as an image which can be displayed allows text information corresponding to a message to be displayed while the audio portion of the message is played back as part of a standard video playback operation. The displayed text may include enhanced caller ID information, the time at which the message was recorded and/or an automatically generated text transcript of the message. Because text as well as audio information can be presented in accordance with the invention in a synchronized manner, the methods and apparatus of the invention are particularly well suited for providing voice mail access to the hearing impaired.

The VOD file generated by the transcoder is supplied to a VOD server which provides the file including the message to the set top box for display. When the VOD file is available for delivery, a signal may be communicated to the STB corresponding to the requesting voice mail user to notify the STB and/or the user that the voice mail content is available for delivery. Final delivery of the VOD file may be initiated by a user sending a command to the STB or by an application on the STB automatically requesting delivery from the VOD server of the VOD file including the requested voice mail content.

A user can listen and review the messages, including any images associated therewith including text information, and switch from viewing one message to the next by using video play back commands including commands used to jump from one portion of the VOD file to another or to fast forward or rewind. Commands to delete particular messages or forward messages may be communicated from the STB to the VM server so that the user has the opportunity to delete messages from the voice mail server via the STB. The communication of a command may involve relaying and/or processing of the command by one or more intermediate devices such as a server or SIP proxy, to generate a signal communicated to the voice mail server and used to control the voice mail server to perform the command.

Given that the VOD based method of delivering voice mail messages via set top boxes can be implemented in many cases with relatively minor modifications to deployed cable systems, the methods and apparatus described herein are particularly well suited for providing improved levels of integration between voice mail and video subscription services.

Numerous additional benefits, features and embodiments of the methods and apparatus of the present invention are described in the detailed description which follows.

BRIEF DESCRIPTION OF THE DRAWINGS

FIG. 2 which comprises the combination of FIGS. 2A and 2B, is a flowchart illustrating the steps of an exemplary method of providing access to voice mail content, in accordance with one aspect of the invention.

DETAILED DESCRIPTION

Figure 1:
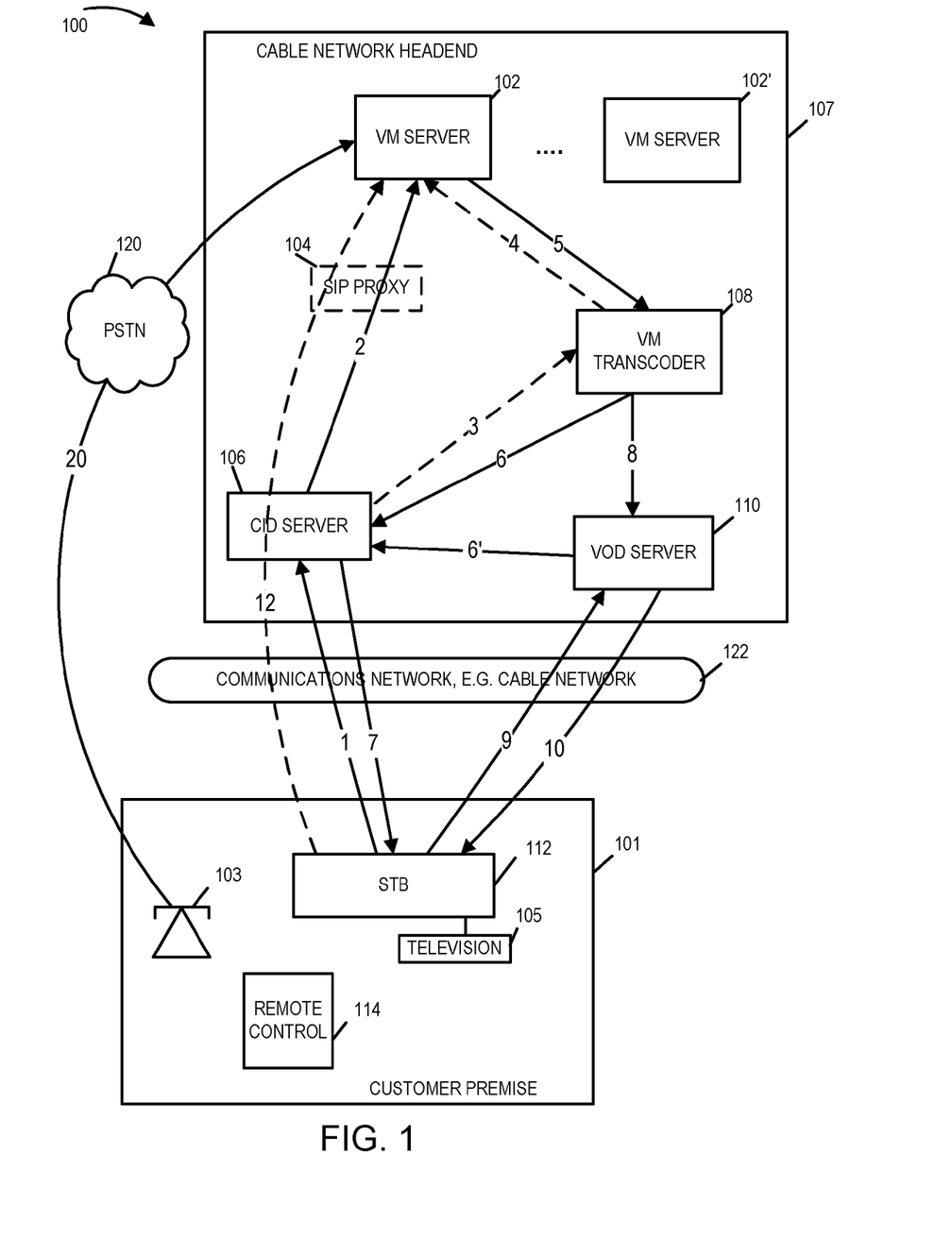
FIG. 1 illustrates an exemplary system and signaling among various elements of the system, in accordance with one embodiment of the invention.

FIG. 1 illustrates an exemplary system 100 and signaling among various elements of the system, in accordance with one embodiment of the invention.

Exemplary system 100 includes a public switched telephone network 120, a cable network headend 107, a cable network 122 and a customer premise 101, e.g., home or office of a voice mail service subscriber, which are coupled together as shown in FIG. 1.

The cable network headend 107, e.g., cable office in which cable system elements are located, includes a plurality of voice mail (VM) servers 102, . . . , 102', a caller identification (CID) server 106, a transcoder 108, e.g., a voice mail transcoder, and a Video on Demand (VOD) server 110. In some but not all embodiments a SIP (session initiation protocol) proxy 104 is included and serves to support communications between the CID server 106 and VM server 102. The CID server 106, in some embodiments provides notification of received voice mail messages along with caller identification information relating to the caller who left a voice mail message.

The customer premise 101, e.g., a voice mail subscriber's residence or office, includes various pieces of customer premise equipment (CPE) which support communications including accessing voice mail. The customer premise equipment includes a set top box (STB) 112, a telephone 103 and a television 105 or other audio/video output device. A remote control 114 which can be used by a voice mail user, to control the STB 112, is also located at the customer premise 101. Notification of voice mail messages may be sent to the STB 112 from the CID server 106 to notify a voice mail user, e.g., the service subscriber to whom the STB 112 corresponds, of a voice mail message. The notification message may be displayed on the television 105 coupled to the STB 112. Thus it should be appreciated that CID server 106 includes an interface for receiving/sending signals to/from STB 112 and VM sever 102.

As will be discussed below, via telephone 103 and PSTN 120 a voice mail service subscriber located at customer premise 101 can access and retrieve voice mail messages stored on VM server 102. In addition, in accordance with the invention, the voice mail service subscriber may also retrieve and access voice mail messages stored on VM server 102 via STB 112 and cable network 122 with one or more retrieved voice mail messages being played back as part a video on demand session with the voice mail being routed via VOD server 110. The VOD server 110 may be, and in many cases is, a VOD server which is also used to provide pay per view and/or other videos on demand in response to a subscriber's request made via STB 112.

In accordance with one feature of the invention, when a user, e.g., subscriber wishes to access voice messages corresponding to his/her voice mail account, the subscriber sends a signal from a control device, e.g., a remote control, to the set top box (STB) 112 indicating the subscriber's desire to access voice mail content corresponding to the subscriber's voice mail account and, in some cases, identifying one or more voice mail messages to be retrieved. In accordance with one aspect of the invention the signal from the subscriber to the STB 112 triggers the STB 112 to send a request signal 1 to the CID server 106. The CID server 106 receives the request signal 1 from the STB 112. In some embodiments, the CID server verifies the subscriber ID or authenticates the subscriber that requested access to the voice mail, e.g., by checking a password, PIN or some other security code used for security purposes and/or for controlling access to a particular voice mail account. In some embodiments, the request signal 1 identifies a voice mail account of the subscriber and at least one stored message corresponding to the voice mail account which is to be retrieved. In some embodiments, the request signal 1 identifies a plurality of messages which are stored as separate files on the VM server 102, which are to be retrieved and played back to the requested voice mail service subscriber.

The CID server 106, after receiving the request signal 1, determines which of the plurality of VM servers 102, . . . , 102' stores the voice mail content corresponding to the voice mail and/or voice mail subscriber identified by the request signal 1.

After identifying the relevant voice mail server 102, CID server 106, sends a control message used to initiate retrieval of the requested voice mail. The control message, e.g., signal 2 or 3, is sent to at least one of the identified VM server 102 and transcoder 108. In embodiments where the control message is sent to the VM server 102, the control message triggers the VM server 102 to output the requested voice mail content to the transcoder 108. In some embodiments an optional SIP proxy 104, shown in FIG. 1 using dashed lines, is used to communicate the voice mail retrieval control message from the CID server 106 to the VM server 102.

In some other embodiments the control message used to initiate retrieval of the requested voice mail from the VM server 108 is sent from the CID server 106, e.g., as signal 3, to the transcoder 108. Receipt of the control signal 3 causes the transcoder 108 to send a request, e.g., signal 4, to the VM server 106 to supply the voice mail content to the transcoder 108.

The transfer of the voice mail content, i.e., the messages or messages which were requested, to the voice mail transcoder is represented in FIG. 1 as signal 5. As noted above, this transfer may be in response to signal 2 from the CID server or signal 4 from the voice mail transcoder.

In some embodiments, the requested voice mail content is communicated from the voice mail server 102 in a real time streaming protocol (RTSP) data stream. Thus signal 5 may, and in some embodiments does, represent RTSP communication of the requested voice mail content to the transcoder 108.

Following the receipt of the voice mail content from the VM server 102, the transcoder 108 converts the voice mail content corresponding to a voice message from a first format, e.g., a G711Ulaw format, a G.729 format, a G.726 format, a AMR (Adaptive Multi-Rate) format or a EVRC (Enhanced Variable Rate Codec) format, often used for telephony related applications to a second format, the second format being supported by the video on demand server 110 and/or STB 112. In some embodiments the second format is one of an MPEG-2 format and AC3 audio format. The first format, e.g., an audio coding format, that is different from said second format which may be an audio format and/or a combined audio coding format used for combined audio/video presentation. The second format may be, and sometimes is, an MPEG-2 or MPEG-4 format specified by the Moving Picture Experts Group of the ISO (International Organization for Standardization). The first format is, e.g., a format in which the voice mail content is stored on the VM server 102. In some embodiments the voice mail content sent from the VM server 102 includes multiple different voice mail messages which were requested to be retrieved. In one such embodiment the transcoder 108 combines the audio content corresponding to multiple voice mail messages into a single VOD file. The voice mail messages may be included in an audio portion of the VOD file. Caller ID, message date and time information and/or other text or visual information may, and in some embodiments is, coded into the VOD file generated by the transcoder as image data corresponding to one or more audio messages.

In some but not all embodiments, speech recognition and/or other techniques may be used to generate a text version of the content of a voice mail message. A text version of the audio voice mail message may be included in the image portion of the VOD file with the text being presented along with or as an alternative to, the audio version of the message. Such an embodiment is particularly well suited for the hearing impaired who may have difficulty understanding the content of an audio version of the message. Since the text may be generated in an automated manner by the server 108, the VOD method of providing voice mail messages is particularly well suited for providing hearing impaired individuals access to the content of voice mail messages without requiring special equipment at the subscriber's residence and at a low cost.

A separate frame including caller ID and/or other information may be included in the VOD file for each individual audio message with the data information corresponding to a retrieved message being displayed in conjunction with the audio playback of a message as part of a VOD session.

The transcoder 108 generates a VOD file including the voice mail content which has been converted into the second format. As noted above, a single VOD file may be created including multiple messages. In other embodiments one VOD file may be generated for each message.

In addition to including audio and video content, the transcoder 108 may include in the VOD file executable code which, when executed by the STB 112 provides the STB 112 and thus user with voice mail functionality which was not available from the applications available in the STB 112 prior to downloading of the VOD file generated by the transcoder. The application may support user interactivity and give the user the opportunity to enter voice mail related commands or selections not normally supported by the STB 112 when operating to provided other VOD content such as pay per view content.

Thus, while generating the VOD file, in some embodiments, the transcoder 108 includes a set top box 112 executable application in addition to the voice mail content, in the VOD file being generated. As discussed above, the STB executable application may be, e.g., a software update for the STB 112 helping the STB to 112 to, e.g., play the voice mail and/or display information sent in the VOD file. In some embodiments the set top box executable application is an EBIF application. In some embodiments the transcoder 108 includes an EBIF (enhanced binary interchange format) trigger in the VOD file. The EBIF trigger may include control information sent to the STB 112 which may be used to cause the STB 112 to execute an application or present one or more prompts to the subscriber thereby providing the subscriber an opportunity to, for example, indicate/select a voice message from one or more voice messages in the VOD file. The EBIF trigger may be used to cause an EBIF application also included in the VOD file by the transcoder 108 to execute the EBIF application. The EBIF application may be, for example, a voice mail presentation application or another interactive application giving the user the opportunity to playback, skip and/or delete voice mail included in the VOD file.

The transcoder 108 sends the generated VOD file to the VOD server 110. The communication of the generated VOD file including voice mail content and, optionally, application code (EBIF or native STB code which can be executed by a processor in a STB), to the VOD server 110 is represented in FIG. 1 as signal 8.

The downloading of the voice mail content is normally triggered by the STB 112 sending a signal to the VOD server 110. So that the STB 112 can be made aware of the availability of the requested VM content, the transcoder 108 and/or VOD server send a signal (6 or 6') to the CID server 106 indicating that the requested voice mail content is available for playback from the VOD server 110.

Thus, the CID server 106 is informed that the voice mail content is ready for delivery by the VOD server 110. Following the notification (signal 6 or 6') the CID server 106 sends a signal 7 to the STB 112 indicating the voice mail content is available for delivery. Alternatively, in some embodiments, the VOD server notifies the STB 112 of the availability of the requested voice mail content. Once the STB 112 is aware that the requested voice mail content is available, the STB 112 initiates the establishment of an on demand session and identifies to the VOD server the VOD file created by the VM transcoder and supplied to the VOD server 110 which is to be retrieved. The file identification information may, and in some embodiments is communicated to the STB and/or CID server 106 as part of the notification that the VOD file is available at the VOD server 110. Signal 9 which is sent from the STB 112 to the VOD server 108 represents the initiation of a VOD session used to retrieve the voice mail content from the VOD server 110.

In response to the signal from the STB 112, the on demand session is established, and the VOD server 110 delivers the voice mail content to the STB 112 which can be played back to the user and the corresponding information can be displayed on the television 105 with the user being provided with audio and/or video information corresponding to the voice mail message. The user may control the playback of messages and skip between messages in the same manner that a user would control any other VOD session.

In the case of deletion of a voice mail message via a user's interaction with the STB 112, the STB 112 may provide a visual and/or audio indication that the message has been deleted, e.g., via a television coupled to the STB 112. After the deletion, the STB 112 prevents the user from accessing the deleted voice mail message in the VOD file. In some embodiments, the portion of the VOD file corresponding to the deleted message is removed, e.g., deleted from the STB memory. In addition to deleting the message from the VOD file, the STB 112 sends a signal, to cause deletion of the message which the user indicated was to be deleted, from the voice mail server 102. The signal to cause deletion of a message or messages from the subscriber's voice mail stored in the VM server 102 may be sent to the CID server 106 which then relays or sends an additional signal the VM server 102 to cause deletion of a stored voice mail in response to a user signal sent to the STB 112. In addition to a signal to delete a message the STB may send one or more signals to cause the VM server 102 to change a message status from new to saved in response to input from a user which triggers a signal from the STB 112 or in response to an automatically generated signal from the STB 112 which is generated in response to the message having been played. In addition to a user of the STB may control the VM server 102 to forward a voice mail message to a telephone number or other device. Control signals from the STB 112 which are used to control the VM server to update a subscriber's voice mail record and/or take some other action, e.g., after one or more voice mail messages are played back in a VOD file, are represented by dashed arrow 12. Note that arrow 12 is shown passing through CID server 106 and optional SIP proxy 104. These elements may be used to forward the message/signal 12 or may generate a control signal based on a received signal with the generated signal being sent to the VM server 102 and used to control the VM server 102 to perform the communicated action.

Figure 2A:
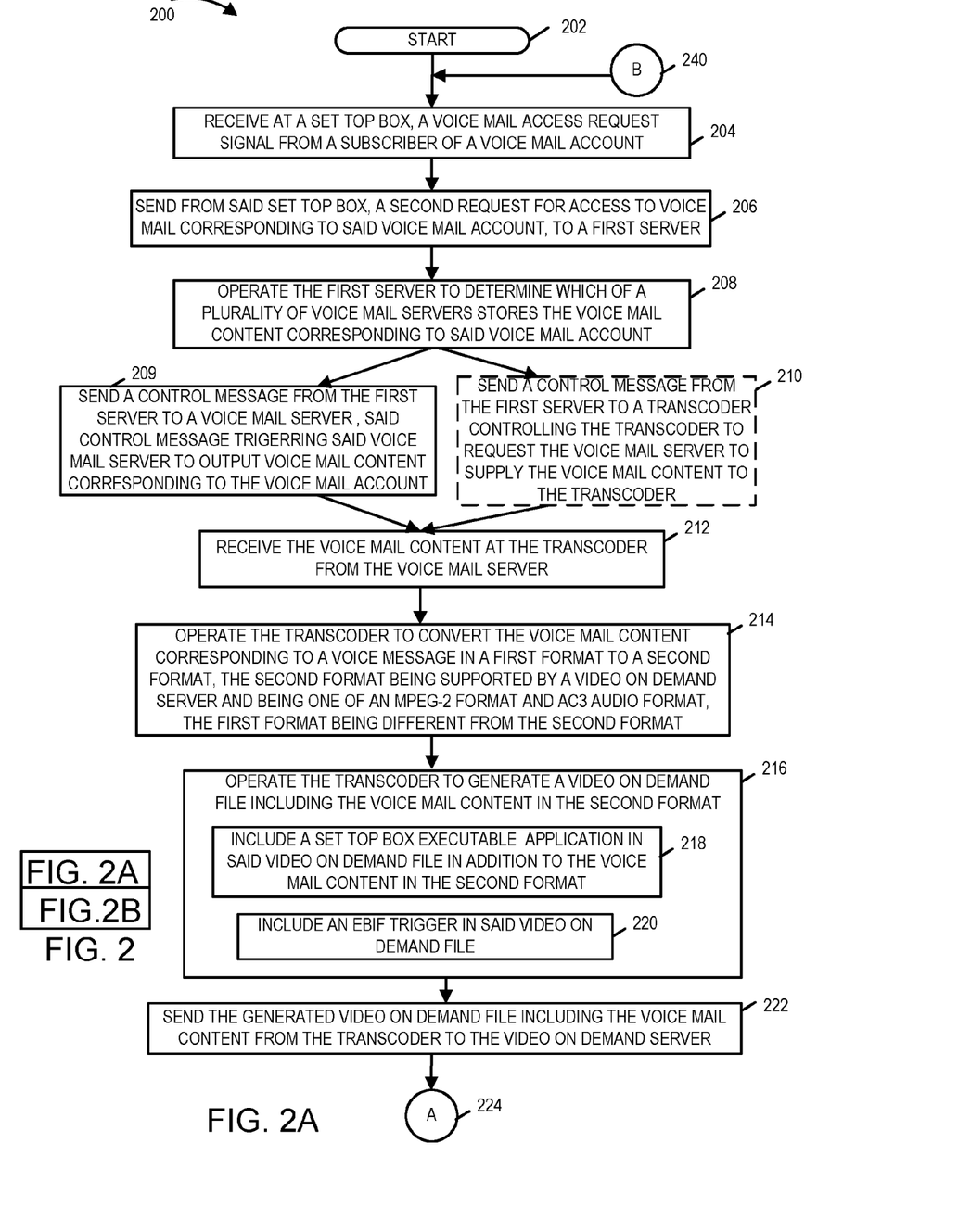
Figure 2B:
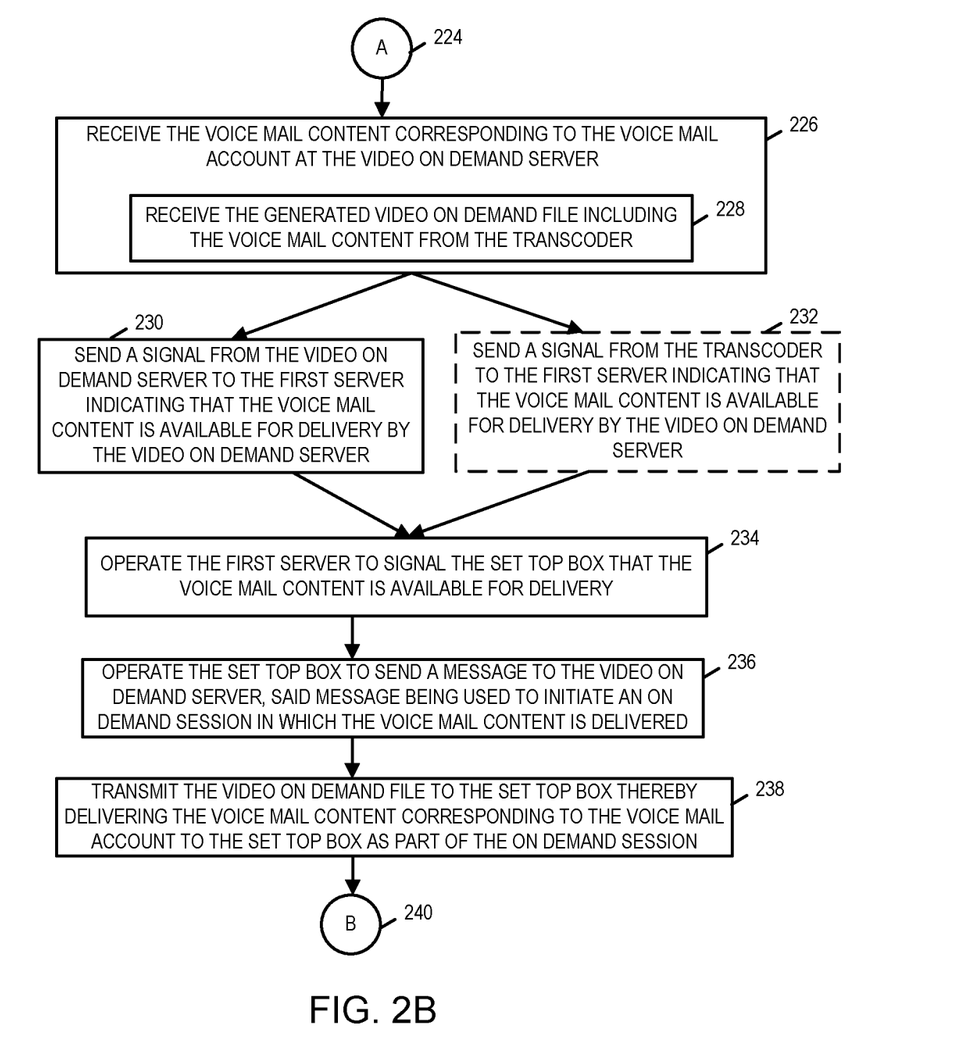

FIG. 2 which comprises the combination of FIGS. 2A and 2B, is a flowchart 200 illustrating the steps of an exemplary method of providing access to voice mail content, in accordance with one aspect of the invention. The flowchart 200 will be discussed with reference to the system 100 discussed above in detail and therefore same signaling notation which has been used while describing communication between the elements of system 100 will be used to discuss various steps of flowchart 200. The operation of the exemplary method starts in step 202 where one or more elements of the system 100 are initialized. Operation proceeds from step 202 to step 204. In step 204 a voice mail access request signal is received at a set top box, e.g., STB 112, from a subscriber of voice mail service. The voice mail access request signal being a request for accessing the voice mail content, e.g., voice messages, corresponding to the subscriber's voice mail account. The subscriber may use a control device such as a remote control 114 to send the voice mail access request signal.

Operation proceeds from step 204 to step 206. Following the receipt of the voice mail access request signal, in step 206 the STB 112 sends a request, e.g., signal 1, for access to the voice mail content corresponding to the voice mail account to a first server. In at least some embodiments the request signal 1 identifies at least one stored message corresponding to the voice mail account which is to be retrieved. In some embodiments request signal 1 identifies a plurality of messages which are stored as separate files on a voice mail server, e.g., server 102, which are to be retrieved and played back to the requested voice mail service subscriber. In some embodiments the first server is a caller identification server, e.g., CID server 106, which supports caller identification services. The CID server 106 receives the request signal 1 from the STB 112, and may verify the subscriber ID and authenticate the subscriber that requested access to the voice mail.

Operation proceeds from step 206 to step 208. In step 208 the CID server 106 is operated to determine which of a plurality of voice mail servers in the system 100, e.g., 102, . . . , 102' stores the voice mail content corresponding to the voice mail account identified in the request signal 1. The operation proceeds from step 208 to step 209 or step 210 depending on the embodiment. In step 209 the CID server 106 sends a control message, e.g., signal 2, to the voice mail server 102 to output the voice mail content corresponding to the subscriber's voice mail account. In some embodiments an optional SIP proxy 104, shown in FIG. 1, is used to communicate the voice mail retrieval control message (signal 2) from the CID server 106 to the VM server 102.

In some other embodiments where step 210 is performed, the CID server 106 sends a control message, e.g., signal 3, to a transcoder, e.g., voice mail transcoder 108, controlling the transcoder 108 to request, e.g., via signal 4, the voice mail server 102 to supply the voice mail content to the transcoder 108. Operation proceeds from 209 or step 210 to step 212.

In response to either the control message 2 sent from the CID server 106 or the request signal 4 sent from the transcoder 108, in step 212 the transcoder 108 receives the voice mail content from the voice mail server 102 as shown using signal 5. In some embodiments, the requested voice mail content is communicated from the voice mail server 102 in a real time streaming protocol (RTSP) data stream. Operation proceeds from step 212 to step 214. In step 214 after receiving the voice mail content from the voice mail server 102, the transcoder 108 is operated to convert the voice mail content corresponding to a voice message in a first format to a second format, the second format being a format supported by a video on demand server, e.g., VOD server 110, and being one of an MPEG-2 format and AC3 audio format. The first format is, e.g., a format in which the voice mail content is stored on the VM server 102. For example, the first format is, e.g., one of a G.711Ulaw compliant format, a G.729 compliant format, a G.726 compliant format, an AMR format, and a EVRC format, commonly used for audio sent over telephones or for voice over IP calls and is different from the second format, e.g., an MPEG-2 or AC3 format, commonly used for the audio corresponding to a video presentation. G.711, G.729, and G.726 are described in various ITU Standards Documents.

Operation proceeds from step 214 to step 216 where the transcoder is operated to generate a video on demand (VOD) file including the voice mail content in the second format. In some embodiments the voice mail content sent from the VM server 102 to the transcoder 108, includes multiple different voice mail messages which were requested to be retrieved. In one such embodiment the transcoder 108 combines the audio content corresponding to multiple voice mail messages into a single VOD file. As discussed earlier, the voice mail messages may be included in an audio portion of the VOD file. Other relevant information associated with one or more voice mail messages such as Caller ID, message date and time information and/or other text or visual information may be coded into the VOD file generated by the transcoder 108 as image data. Thus in some embodiments, a single VOD file may be created including multiple messages. In other embodiments one VOD file may be generated for each message.

In some embodiments, as a part of step 216 sub-steps 218 and 220 are also performed. In addition to including voice mail content in the generated VOD file, the transcoder 108 in step 218 includes in the VOD file, STB 112 executable application which when executed by the STB 112 provides the STB 112 and thus user with voice mail functionality which was not available from the applications available in the STB 112 prior to downloading of the VOD file generated by the transcoder 108. The application may support user interactivity and give the user the opportunity to enter voice mail related commands or selections not normally supported by the STB 112 when operating to provide other VOD content such as pay per view content. The STB executable application may be, e.g., a software update for the STB 112 helping the STB to 112 to, e.g., play the voice mail and/or display information sent in the VOD file. In sub-step 220 the transcoder 108 includes an EBIF (enhanced binary interchange format) trigger in the VOD file. The EBIF triggers may include control information sent to the STB 112 which may be used to cause the STB 112 to execute an application or present one or more prompts to the subscriber thereby providing the subscriber an opportunity to, for example, indicate/select a voice message from one or more voice messages in the VOD file.

Operation proceeds from step 216 to step 222. In step 222 the transcoder 108 sends the generated VOD file including the voice mail content to the VOD server 110. The communication of the generated VOD file including voice mail content and, optionally, application code, to the VOD server 110 is represented in FIG. 1 as signal 8. The operation proceeds from step 222 to step 226 via connecting node A 224. In step 226 the VOD server 110 receives the voice mail content corresponding to the voice mail account. As part of the step 226 of receiving the voice mail content, in step 228 the VOD server 110 receives the transcoder generated VOD file including the voice mail content from the transcoder 108.

Operation proceeds from step 226 to one of step 230 and 232 depending on the embodiment and implementation. Thus in some embodiments step 230 is performed, while step 232 is performed in some other embodiments. In step 230 the VOD server 110 sends a signal, e.g., signal 6 of FIG. 1, to the CID server indicating that the requested voice mail content is available for delivery by the VOD server 110. In some other embodiments where step 232 is performed, the transcoder 108 sends a signal (signal 6' shown in FIG. 1) indicating that the requested voice mail content is available for delivery by the VOD server 110.

Operation proceeds from step 230 or 232 to step 234. Following the receipt of either of the signals 6 or 6' by the first server 106, in step 234 the first server 106 is operated to signal the STB 112 that the voice mail content is available for delivery to the STB 112, e.g., during an on demand session. The communication of such a signal is shown in FIG. 1 using signal 7. The operation proceeds from step 234 to step 236 where the STB 112 is operated to send a message (signal 9 of FIG. 1) to the VOD server 110, the message being used to initiate an on demand session in which the voice mail content can be delivered. For example, once the STB 112 is aware that the requested voice mail content is available, the STB 112 initiates the establishment of an on demand session and identifies to the VOD server the VOD file created by the VM transcoder 108 and supplied to the VOD server 110 which is to be retrieved. The file identification information may, and in some embodiments is communicated to the STB and/or the CID server 106 as part of the notification that the VOD file is available at the VOD server 110. Signal 9 which is sent from the STB 112 to the VOD server 110 represents the initiation of a VOD session used to retrieve the voice mail content from the VOD server 110.

Operation proceeds from step 236 to step 238. In step 238 in response to the signal 9 from the STB 112, the on demand session is established, and the VOD server 110 transmits the VOD file including the voice mail content to the STB 112 thereby delivering the voice mail content corresponding to the voice mail account to the STB 112 as part of the on demand session, which can be played back to the user and the corresponding information can be displayed on the television 105 with the user being provided with audio and/or video information corresponding to the voice mail message. The user may control the playback of messages, select between voice messages to be played, delete and/or store one or more selected voice messages on the STB 112 if desired, and perform various other tasks. The operation proceeds from step 238 back to step 204 via connecting node B 240 and the operation may repeat, e.g., when another request to access voice mail is received from the subscriber.

Figure 3:
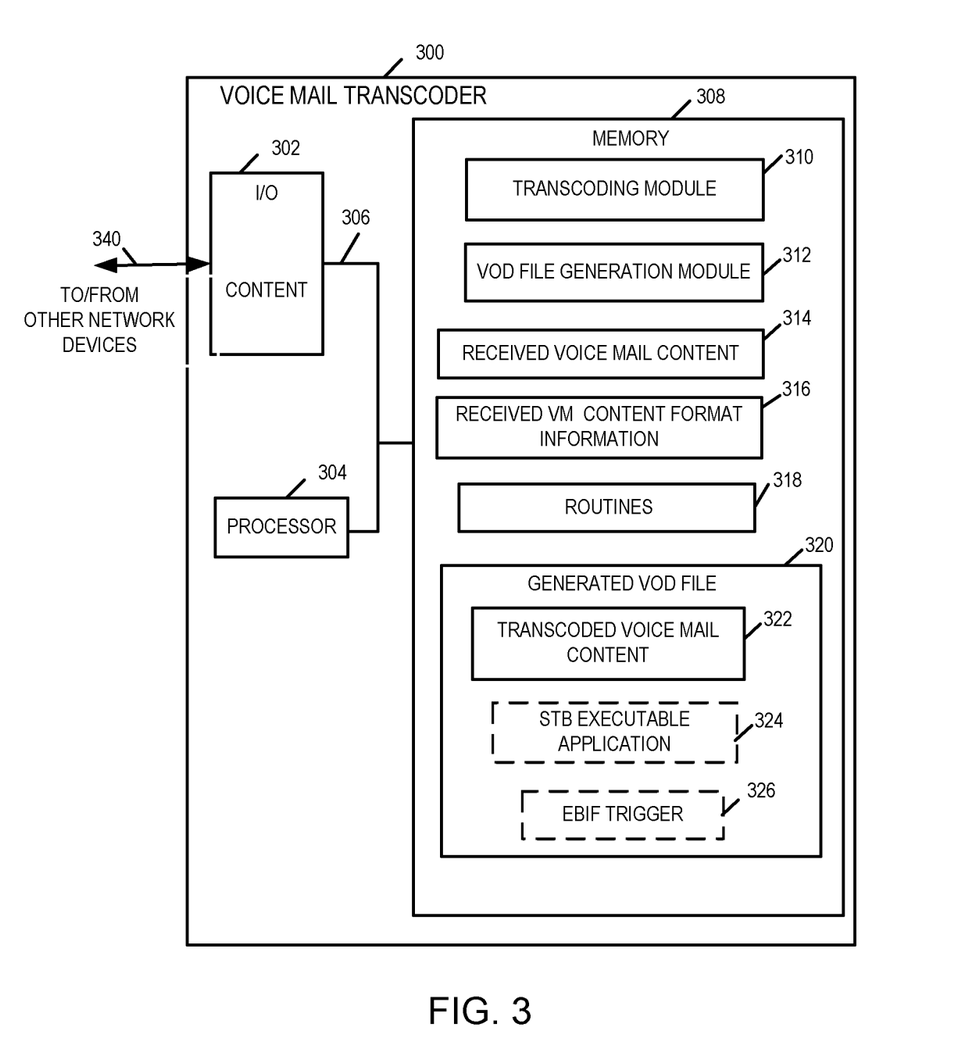
FIG. 3 illustrates an exemplary voice mail transcoder implemented in accordance with one exemplary embodiment.

FIG. 3 illustrates an exemplary voice mail transcoder 300, in accordance with one exemplary embodiment. The exemplary transcoder 300 can be used as the transcoder 108 shown in the system of FIG. 1. As shown, the VM transcoder 300 includes an Input/Output (I/O) interface 302, a processor 304 and a memory 308. The I/O interface 302, processor 304 and the memory 308 are coupled together via bus 306. Various elements of the VM transcoder 300 can exchange data and information over the bus 306.

Via the I/O interface 302, VM transcoder 300 can exchange signals and/or information with other devices and/or system elements such as the VM server 102, CID server 106, VOD server in the cable network head end 107. The I/O interface 302 supports the receipt of voice mail content, e.g., from VM server 102 as well as transmission of voice mail content, e.g., to the VOD server, as represented by arrow 340.

The processor 304, e.g., a CPU, executes routines 318 stored in the memory 308 and, under direction of the routines 318, controls the transcoder 300 to operate and perform various tasks, e.g., sending request for voice mail content to the VM server 102, receiving voice mail content etc., in accordance with the invention. To control the transcoder 300, the processor 304 uses information and/or routines including instructions stored in memory 308.

The memory 308 includes a transcoding module 310, a VOD file generation module 312, received voice mail content 314, received VM content format information 316, routines 318, generated VOD file 320. The generated VOD file 320 includes the transcoded voice mail content 322 and optionally STB executable application 324 and EBIF trigger 326. Routines 224 include communications routines and/or set top box control routines.

The transcoding module 310 is responsible for converting the received voice mail content corresponding to one or more voice message in a first format to a second format. The second format, e.g., MPEG-2 format or a AVC compliant format is supported by the VOD server 110. The VOD file generation module 312 is responsible for generating a video on demand file and takes the transcoded voice mail content as an input. In some embodiments the VOD file generation module 312 is configured to include set top box executable application in the VOD file being generated in addition to the voice mail content in the second format. In some embodiments the VOD file generation module 312 is further configured to include an EBIF trigger in the generated VOD file. The generated VOD file 320 is an output of the VOD file generation module 312.

The received voice mail content 314 is the voice mail content corresponding to one or more voice messages that is received from the VM server 102. The received voice mail content 314 may be received in response to a voice mail content request (e.g., signal 4) from the transcoder 300 to the VM server 102 or in response to a request signal from the CID server 106 to the VM server 102 requesting to supply the voice mail content to the transcoder 300 (108). The received voice mail content format information 316 includes information regarding the first format in which the voice mail content is received from the VM server 102. The received voice mail content format information 316 may be used by the transcoding module 310 while converting the voice mail content from the first format to the second format. The generated VOD file 320 is the output from the VOD file generation module 312 and includes the transcoded voice mail content 322 in the second format and in some embodiments further includes the STB executable application 324 and EBIF trigger 326.

While shown as separate elements, it should be appreciated that the functionality of CID sever 106, optional SIP proxy 104, VM sever 102 and VM transcoder 108 may be integrated into a single device or the functionality may be distributed between multiple devices. In the single device embodiment, the device performing the described functions may include modules which perform the functions of the separate devices 106, 104, 102, 108 with internal signals being used in place of the numbered messages between the devices shown in FIG. 1. Thus it should be appreciated that the level of integration and number of functions performed by the individual devices used to implement the system may vary depending on the particular network implementation.

The techniques of the present invention may be implemented using software, hardware and/or a combination of software and hardware. In the case of software, computer executable instructions used to control a processor may be stored in memory or another storage device and then executed by a processor. The present invention is directed to apparatus, e.g., communications devices such as telephones, servers, and/or other communications system elements which implement all or a portion of the present invention. It is also directed to methods, e.g., method of controlling and/or operating communication system elements to implement one or more portions of the methods of the invention. The present invention is also directed to machine readable medium, e.g., ROM, RAM, CDs, hard discs, etc., which include machine readable instructions for controlling a machine to implement one or more steps in accordance with the present invention.

In various embodiments system elements described herein are implemented using one or more modules to perform the steps corresponding to one or more methods of the present invention, for example, communication detection, communication disposition, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

The methods and apparatus of the present invention, are applicable to and can be used with a one or a combination of systems including cable systems, PSTN systems, cellular systems, etc.

Numerous additional variations of the methods and apparatus of the present invention described above will be apparent to those skilled in the art in view of the above description of the invention. Such variations are to be considered within the scope of the invention.

What is claimed is:

1. A method of operating a device, the method comprising:
   receiving voice mail content from a voice mail server;
   generating a video on demand (VOD) file including the received voice mail content, said step of generating a VOD file including:
   including a set top box executable application along with said voice mail content in said VOD file; and
   communicating said VOD file including said set top box executable application and voice mail content to another device.

2. The method of claim 1, wherein said set top box executable application is an application which when executed by a set top box controls the set top box to provide a user with voice mail functionality which was otherwise not available.

3. The method of claim 2, wherein said set top box executable application is an application that allows the set top box to perform at least one of: play said voice mail content or display information communicated in the VOD file.

4. The method of claim 1, wherein said voice mail content is received in a first format, the method further comprising:
   transcoding the voice mail content in the first format to a second format which is different from the first format.

5. The method of claim 4, wherein said first format is one of: a G711Ulaw compliant format, a G.729 compliant format, an Adaptive Multi-Rate (AMR) format, a G.726 compliant format, or a Enhanced variable rate codec (EVRC) format.

6. The method of claim 4, wherein said second format is a format supported by a video on demand server and being one of: an MPEG-2 format or AC3 audio format.

7. The method of claim 4, wherein the generated VOD file includes the voice mail content in the second format.

8. The method of claim 1, wherein said step of generating a VOD file further includes:
   including an EBIF trigger in said video on demand file.

9. The method of claim 1, wherein said voice mail content includes multiple different voice mail messages which were requested.

10. The method of claim 1, wherein said another device is a video on demand server which delivers video on demand content to a set top box.

11. An apparatus, comprising:
    an interface configured to receive voice mail content from a voice mail server; and
    a processor configured to:
    generate a video on demand (VOD) file including the received voice mail content, said processor being further configured to include a set top box executable application along with said voice mail content in said VOD file as part of being configured to generate the VOD file; and
    control said interface to communicate said VOD file including said set top box executable application and voice mail content to another device.

12. The apparatus of claim 11, wherein said set top box executable application is an application which when executed by a set top box controls the set top box to provide a user with voice mail functionality which was otherwise not available.

13. The apparatus of claim 12, wherein said set top box executable application is an application that allows the set top box to perform at least one of: play said voice mail content or display information communicated in the VOD file.

14. The apparatus of claim 11, wherein said apparatus is a transcoder; and
wherein said voice mail content includes multiple different voice mail messages which were requested.

15. The apparatus of claim 11, wherein said voice mail content is received in a first format; and
wherein said processor transcodes the voice mail content in the first format to a second format which is different from the first format.

16. The apparatus of claim 15, wherein said first format is one of: a G711Ulaw compliant format, a G.729 compliant format, an Adaptive Multi-Rate (AMR) format, a G.726 compliant format, or a Enhanced variable rate codec (EVRC) format.

17. The apparatus of claim 15, wherein said second format is a format supported by a video on demand server and being one of: an MPEG-2 format or AC3 audio format.

18. The apparatus of claim 15, wherein the generated VOD file includes the voice mail content in the second format.

19. The apparatus of claim 11, wherein said processor includes an EBIF trigger in said video on demand file, as part of being configured to generate the VOD file.

20. The apparatus of claim 11, wherein said another device is a video on demand server which delivers video on demand content to a set top box.

* * * * *